(12) United States Patent
Chen et al.

(10) Patent No.: US 7,887,192 B2
(45) Date of Patent: Feb. 15, 2011

(54) METHOD AND PRISM FOR IMPROVING ILLUMINATION EFFICIENCY IN OPTICAL PROJECTION SYSTEM

(75) Inventors: His-Chao Chen, Taoyuan County (TW); Junejei Huang, Taoyuan County (TW)

(73) Assignee: Delta Electronics, Inc., Guei-Shan Hsiang (TW)

( * ) Notice: Subject to any disclaimer, the term of this patent is extended or adjusted under 35 U.S.C. 154(b) by 1247 days.

(21) Appl. No.: 11/382,356

(22) Filed: May 9, 2006

(65) Prior Publication Data

US 2007/0076173 A1   Apr. 5, 2007

(30) Foreign Application Priority Data

Sep. 30, 2005   (TW) ............................... 94134192 A

(51) Int. Cl.
*G03B 21/26* (2006.01)
*G03B 5/04* (2006.01)
(52) U.S. Cl. ............................ 353/33; 359/634; 353/84
(58) Field of Classification Search .................. 353/20, 353/31, 33, 34, 37, 80, 81, 84; 349/5, 7, 349/8; 359/634
See application file for complete search history.

(56) References Cited

U.S. PATENT DOCUMENTS

| | | | |
|---|---|---|---|
| 3,303,278 A | 2/1967 | Beno et al. | |
| 5,321,499 A | 6/1994 | Yu et al. | |
| 5,826,959 A | 10/1998 | Atsuchi | |
| 5,914,817 A * | 6/1999 | Browning et al. | 359/634 |
| 6,019,474 A | 2/2000 | Doany et al. | |
| 6,238,051 B1 | 5/2001 | Huang | |
| 7,066,603 B2 * | 6/2006 | Akiya | 353/81 |
| 7,518,803 B2 * | 4/2009 | Sawai et al. | 359/638 |
| 7,839,571 B2 * | 11/2010 | Saita et al. | 359/618 |
| 2002/0135706 A1 * | 9/2002 | Sawamura | 349/5 |
| 2005/0057729 A1 | 3/2005 | Huang | |

* cited by examiner

*Primary Examiner*—William C Dowling
(74) *Attorney, Agent, or Firm*—Grossman, Tucker, Perreault & Pfleger, PLLC

(57) ABSTRACT

A method and a prism for improving illumination efficiency in an optical projection system are disclosed. Two dichroic mirrors for both red-reflecting and blue-reflecting lights are utilised for dividing illumination light in the optical projection system. Furthermore, an X-cube is also adopted as a light combining prism in the optical projection system. Without modifying any colour light's transmission path and shape of the X-cube, the method adopts multilayered thin-film optical coatings for blue-reflecting and red-reflecting lights inside the X-cube. The coatings make the same wavelength drift of spectrum for both P and S polarised lights between the dichroic mirrors and the X-cube. This achieves high transparency ratio and improves illumination efficiency with lower cost.

11 Claims, 9 Drawing Sheets

METHOD AND PRISM FOR IMPROVING ILLUMINATION EFFICIENCY IN OPTICAL PROJECTION SYSTEM

BACKGROUND OF THE INVENTION

1. Field of the Invention

The present invention relates to a method and a combining prism for improving illumination efficiency in an optical projection system. In detail, the present invention relates to a method for designing a thin-film optical coating for blue reflecting (or light splitting thin-film coating) and a thin-film optical coating for red reflecting inside an X-cube of an optical projection system and a combining prism produced according to the method.

2. Description of the Related Art

Conventional three-piece digital light processing (DLP) projection systems use Philips Prisms for the light splitter and combining systems. The DLP projection system disclosed in US 20050057729 uses blue-reflecting and red-reflecting dichroic mirrors as the splitter system to split the three primary colours and an X-cube is disposed after the splitter system as the three primary colours combining system, as shown in FIG. 1. In order to use the X-cube as the combining element for a liquid crystal display (LCD) projection system and to meet the requirements of liquid crystal, the application of a polarised incident light is necessary. Therefore, a conventional X-cube has film optical coatings for blue-reflecting and red-reflecting lights formed therein, and such film optical coatings have bigger wavelength drift for each of the P and S polarised lights when the incident angle is 45°. For example, FIG. 2 shows a spectrum of a conventional X-cube, where P represents the P-polarised light and S represents the S-polarised light, respectively.

Generally, for dichroic mirrors used in a three primary colours splitter system, the thin-film optical coatings for blue-reflecting and red-reflecting lights are usually coated on a mirror. With an incident light of 45°, the wavelength drift of the P and S polarised lights is about 15 to 25 nm. FIGS. 3 and 4 represent the wavelength drift of the spectrum for each of the P and S polarised blue-reflecting and red-reflecting lights for conventional blue-reflecting and red-reflecting dichroic mirrors, where P represents the P-polarised lights and S represents the S-polarised lights, respectively. The thin-film optical coatings for blue-reflecting and red-reflecting dichroic inside the X-cube are generally coated on prisms, which are subsequently assembled to form an X-cube, as shown in FIG. 5. When the incident light angle is 45°, the wavelength drift of the P and S polarised lights is about 40 to 60 nm, which is different from that in the splitter system. Therefore, the split-polarised lights cannot be effectively combined in the X-Cube combining system. When projected by a projection lens, problems such as bad efficiency of light source, over heated X-cube, and slightly greenish projected white screen, and forming ghost images often arise as a result.

In response to the above problems, U.S. Pat. Nos. 3,303, 278, 5,321,499, 5,826,959, 6,019,474 and 6,238,051 have proposed some suggestions including varying the shape of the prisms and using a smaller incident angle to obtain a smaller wavelength drift of the P and S polarised lights. However, the proposed methods have the following defects:

1. Since the prisms are not squarely cut, the problem of assembling precision arises during manufacturing and assembling;
2. The size of such prisms is bigger than that of a right angle prism which in turn, will increase the overall weight of the projection system; and
3. To meet the requirements of a prism with perpendicular incident, since the three primary lights R, G, B are not perpendicular to one another due to the non-right angle prisms, it is necessary that the incident light path is configured to have an inclined angle, which increases the error of light path calibration and cost of light engine assembling.

SUMMARY OF THE INVENTION

The present invention relates to a method for improving illumination efficiency in an optical projection system, which is directed to a three-piece DLP projection system. Without modifying any light path and cutting shape of the prisms and according to the wavelength drift of the P and S polarised lights caused by polarised 45° incident light of the dichroic mirrors for blue-reflecting and red-reflecting lights in the three primary colours splitter system, the method for producing thin-film optical coatings for blue-reflecting and red-reflecting lights inside an X-cube of a three primary colours combining system is modified so as to make the same wavelength drift of spectrum for both P and S polarised lights between the splitter system and the light combining system to enhance the efficiency of light source, improve the over heating of the X-cube, and solve the problems of a slightly greenish white screen and ghost images.

The present invention chooses two materials with one refractive index close to the other to obtain small wavelength drift of the P and S polarised lights which can even approach zero wavelength drift. The present invention increases the layers of the thin-film coatings and employs different designs of multi-layers to enhance light transparency ratio of the projection system, eliminate possible ripples and dependence of the incident angle.

The other object of the present invention is to provide a light combining prism for improving illumination efficiency in an optical projection system, which is directed to a three-piece DLP projection system. According to the wavelength drift of the P and S polarised lights caused by polarised 45° incident light of the dichroic mirrors for blue-reflecting and red-reflecting lights in the three primary colours splitter system, the arrangement of the thin-film optical coatings for blue-reflecting and red-reflecting lights inside an X-cube of a three primary colours combining system is modified so as to make the same wavelength drift of spectrum for both P and S polarised lights between the splitter system and the light combining system.

The light combining prism according to the present invention chooses two materials with one refractive index close to the other so as to obtain small wavelength drift of the P and S polarised lights which can even approach zero wavelength drift. The present invention increases the layers of the thin-film optical coatings and employs different designs of multi-layers to enhance light transparency ratio of the projection system, eliminate possible ripples and dependence of the incident angle.

Other objects, advantages and novel features of the present invention will be drawn from the following detailed description of preferred embodiments of the present invention with the accompanying drawings, in which:

DESCRIPTIONS OF THE DRAWINGS

DETAILED DESCRIPTION OF THE INVENTION

Figure 1:
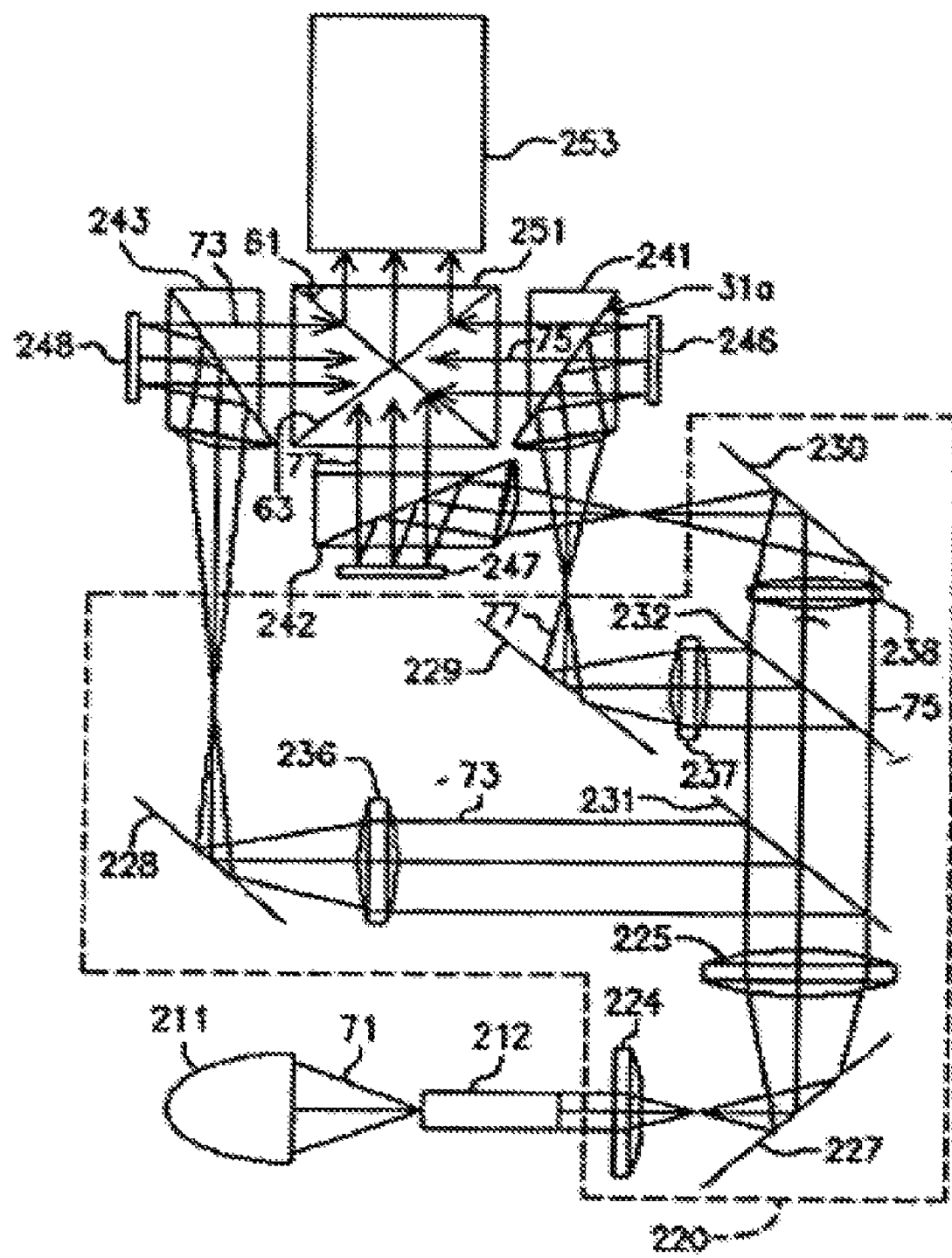
FIG. 1 shows a conventional DLP light projection system using a three primary colours splitter system in conjunction with an X-cube as a three primary colour light combining system.
Figure 2:
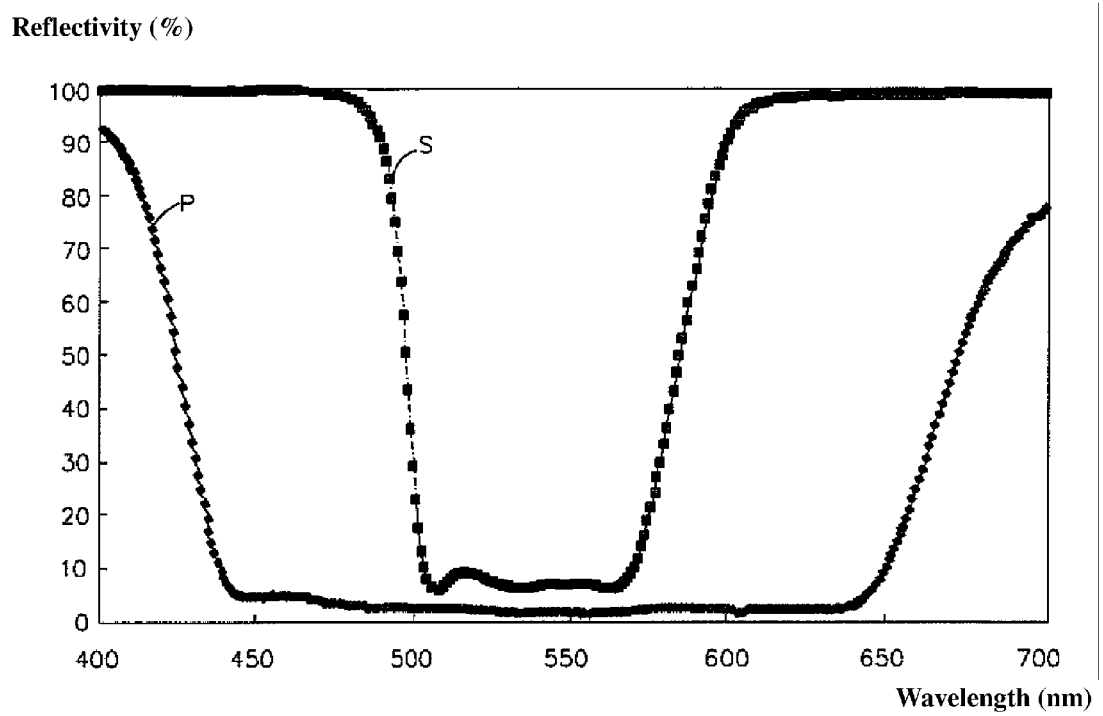
FIG. 2 shows a spectrum diagram of a conventional X-cube.
Figure 3:
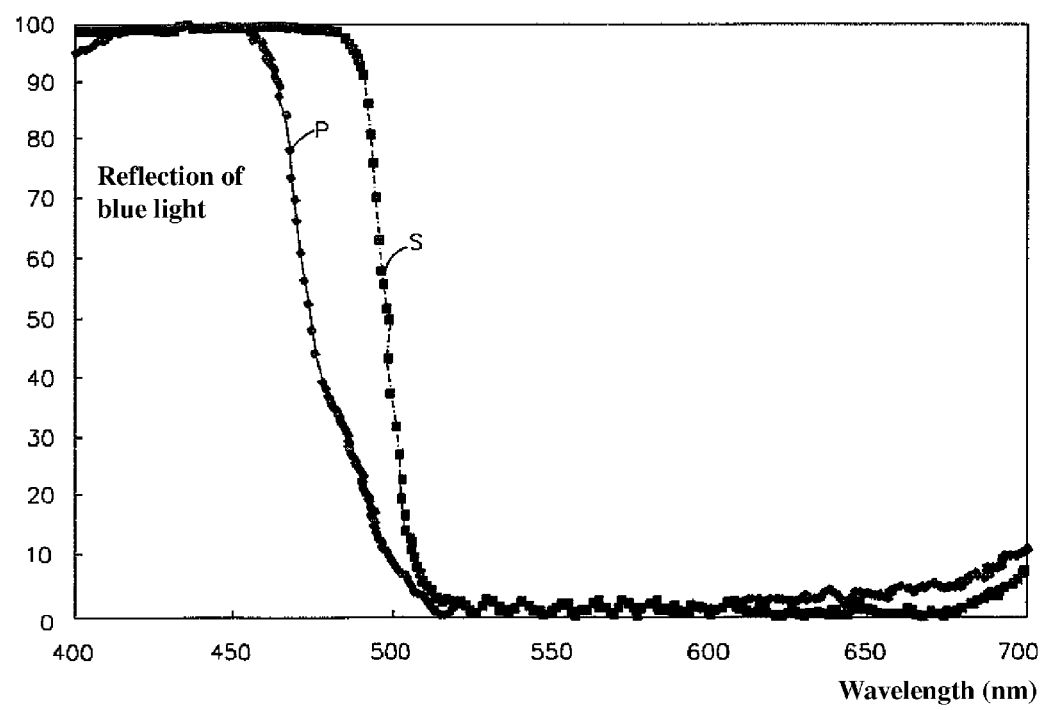
FIG. 3 shows a spectrum diagram of the wavelength drift of the P and S polarised lights for a conventional dichroic mirror for blue-reflecting light.
Figure 4:
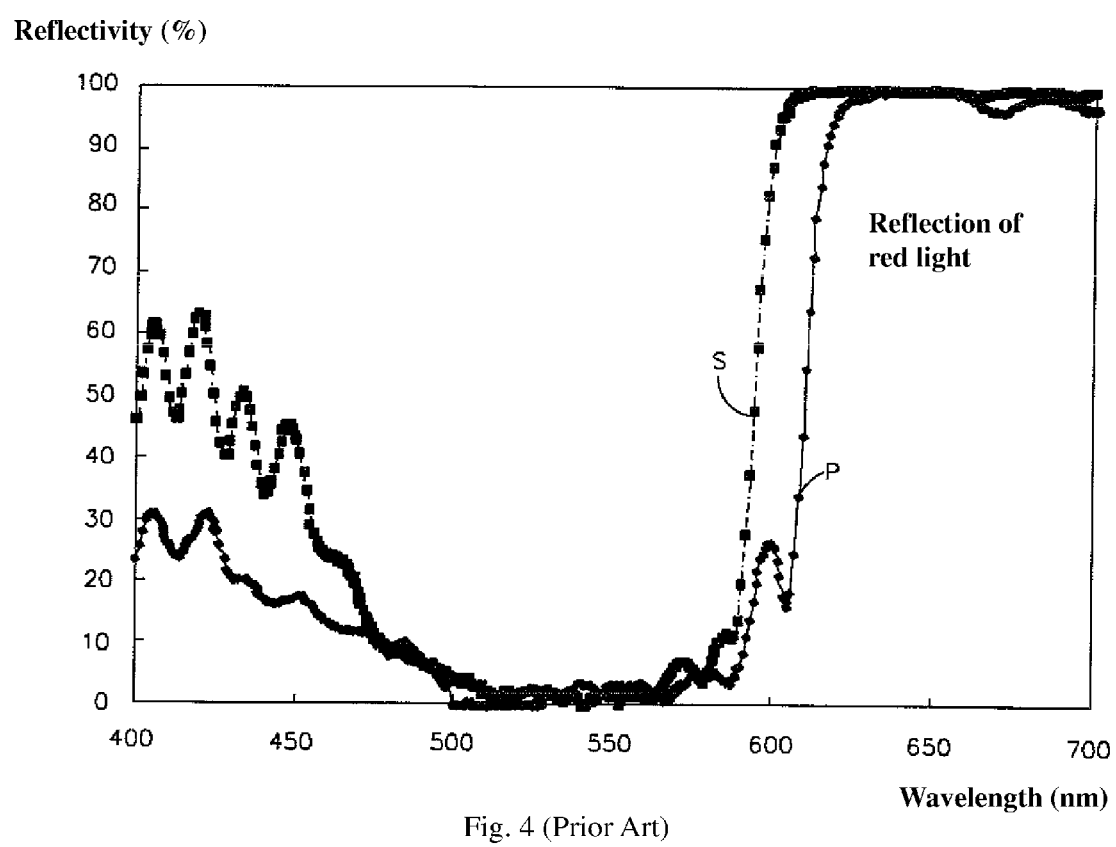
FIG. 4 shows a spectrum diagram of the wavelength drift of the P and S polarised lights for a conventional dichroic mirror for red-reflecting light.
Figure 5:
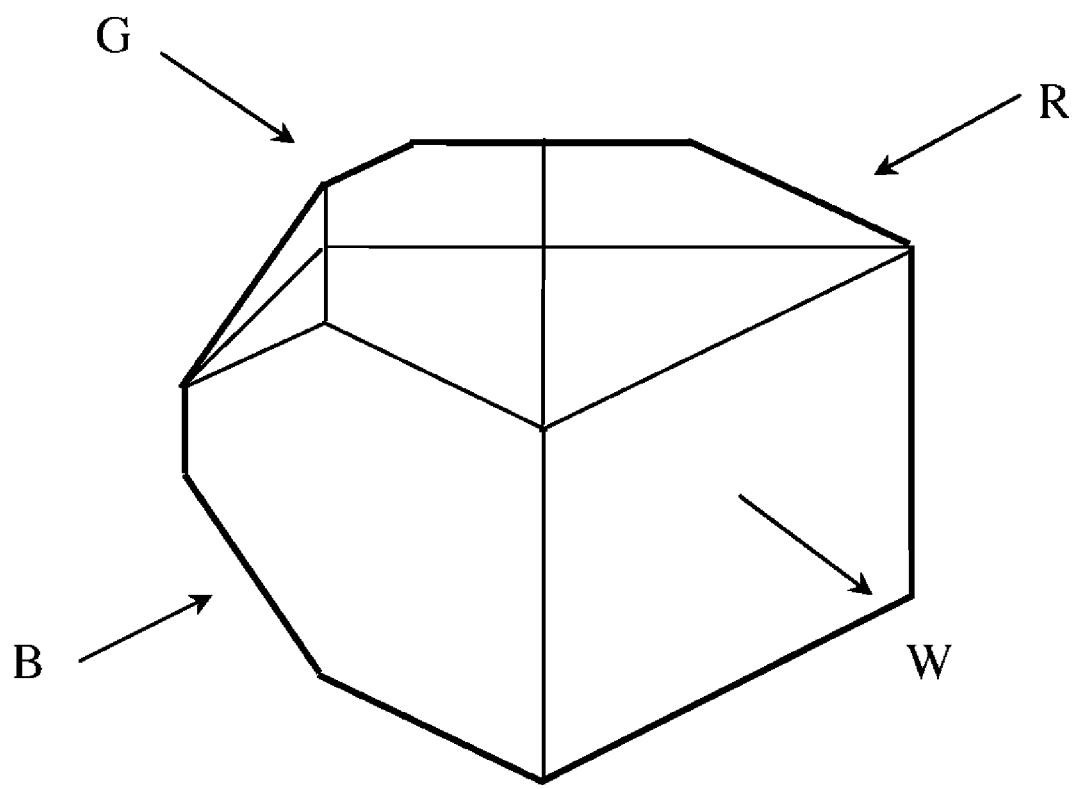
FIG. 5 shows a conventional three primary colours light combining system using an X-cube.

According to the present invention, the method for improving illumination efficiency in optical projection system, comprises the steps of: providing a splitter system; providing a light combining system using an X-cube and disposed after the splitter system; and choosing two materials with one refractive index close to the other to form thin-film optical coatings over dichroic mirrors for blue-reflecting and red-reflecting lights inside the X-cube, respectively, so as to reduce the ratio of high refractive index to low refractive ratio $$\left(\frac{n_H}{n_L}\right),$$

such that the wavelength drift of the spectrum for the P and S polarised blue-reflecting and red-reflecting lights in the X-cube is the same as that in the splitter system.

The thin-film optical coating for blue-reflecting light with the high refractive index can use, for example, titanium oxide ($TiO_2$) or other equivalent material, while the thin-film optical coating for blue-reflecting light with the low refractive index can use, for example, a mixed film of aluminium oxide and tantalum oxide ($Al_2O_3+Ta_2O_5$) or other equivalent materials. The thin-film optical coating for red-reflecting light with the high refractive index can use, for example, tantalum oxide ($Ta_2O_5$) or other equivalent material, while the thin-film optical coating for red-reflecting light with the low refractive index can use, for example, a mixed film of aluminium oxide and tantalum oxide ($Al_2O_3+Ta_2O_5$) or other equivalent materials.

The X-cube according to the present invention is squarely cut such that the plane of the thin-film optical coating for blue-reflecting light is orthogonal to that for red-reflecting light. The incident light angle of the thin-film optical coatings for both the blue-reflecting and red-reflecting lights is 45°. The method according to the present invention, further comprises adjusting the number of layers of the thin-film optical coatings of dichroic mirrors for both blue-reflecting and red-reflecting lights, such that the wavelength drift of the spectrum for the P and S polarised blue-reflecting and red-reflecting lights in the X-cube is the same as that in the splitter system. According to the present invention, the thin-film optical coatings for blue-reflecting light are disposed over a substrate (or base) in a prism. The number of layers of the thin-film optical coatings for blue-reflecting light can be from 50 to 90 and preferably 60 or 80. The thin-film optical coatings for red-reflecting light are also disposed over a substrate in a prism. The number of layers of the thin-film optical coatings for red-reflecting light can be from 70 to 110 and preferably 80 or 100.

If the way of polarisation in the splitter system is different from that in the thin-film optical coatings for blue-reflecting and red-reflecting lights in the light combining system, an optical retarder (not shown in figures) can be used to correct the direction of the polarised lights such that the direction of polarisation in the splitter system is the same as that in the thin-film optical coatings for blue-reflecting and red-reflecting lights in the X-cube.

Figure 6:
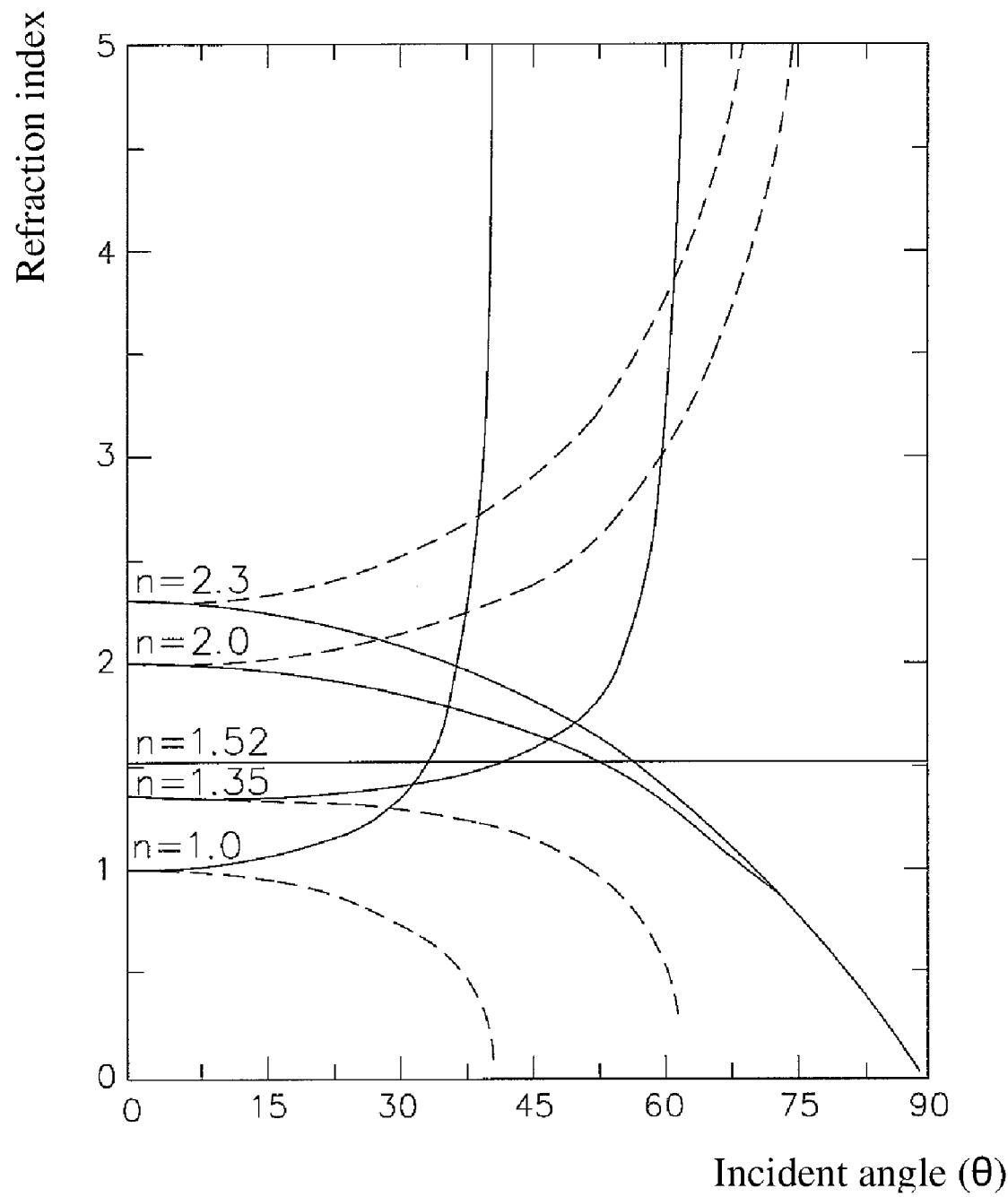
FIG. 6 shows a diagram of refractive index of the corrected P and S polarised lights in relation to angles when the refractive index no of the glass incident plane is 1.52 according to the present invention.

FIG. 6 shows the relationship of optical admittance (refractive index) of the corrected P and S polarised lights with respect to angles when the refractive index $n_0$ of the glass incident plane is 1.52, where the solid line represents $n_p$, and the dashed line represents $n_S$.

In conventional prism design, the ratio of high to low refractive index $$\left(\frac{n_H}{n_L}\right)_P$$

becomes smaller for the P polarised light, while that for the S polarised light becomes bigger. This results in quarter-wave multilayer P and S polarised lights high reflection zone, and the former becomes much narrower, while the latter becomes even much wider, which in turn, creates much bigger wavelength drift of P and S polarised lights. This is because that the conventional thin-film coating method employs a higher ratio of refractive index. Although the materials for thin-film coatings are easy to obtain, for the ability of the thin-film coating eliminating polarised lights, there are still problems such as small wave band and dependency of angles.

To improve the above defects, the light combining prism for improving illumination efficiency in the optical projection system according to the present invention does not modify any light path and cutting shape of the prisms, and chooses two materials with one refractive index close to the other for the thin-film optical coatings for blue-reflecting and red-reflecting lights in the X-cube (or light combining prism) of the light combining system so that the ratio of high refractive index to low refractive index $$\left(\frac{n_H}{n_L}\right)_P$$

for the P polarised lights does not become narrower, and the ratio of high refractive index to low refractive index $$\left(\frac{n_H}{n_L}\right)_S$$

for the S polarised lights does not become wider so as to effectively improve the problem of wavelength drift of the P and S polarised lights.

The multilayer design of the present invention references conventional theory of symmetrical multilayer (proposed by L. I. Epstein) to effectively broaden reflectance bands, for example, ABCBA or ABCDCBA, where the basic structure of A and B multilayers can be $$\left(\frac{H}{2}L\frac{H}{2}\right)^n \text{ and } \left(\frac{L}{2}H\frac{L}{2}\right)^n.$$

In addition, the high refractive index (H) and the low refractive index (L) can be adjusted to non quarter-wave stack, for example, 0.9H 0.9L, 0.8H 0.8L, etc., so as to achieve the desired specification of multilayer design, for example, $$G\left|\left(\frac{H}{2}L\frac{H}{2}\right)^{10}H\left(\frac{0.9}{2}H\frac{0.9L}{2}\right)^{10}\right|G.$$

If the way of polarisation in the splitter system is different from that in the thin-film optical coatings for blue-reflecting and red-reflecting lights in the light combining system, an optical retarder (not shown in figures) can be used to correct the direction of the polarised lights such that the direction of polarisation in the splitter system is the same as that in the thin-film optical coatings for blue-reflecting and red-reflecting lights in the light combining system.

The light combining prism according to the present invention chooses two materials with one refractive index close to the other to obtain lower wavelength drift of the P and S polarised lights. The thin-film optical coating for blue-reflecting light with the high refractive index can use, for example, titanium oxide ($TiO_2$) or other equivalent material, while the thin-film optical coating for blue-reflecting light with the low refractive index can use, fore example, a mixed film of aluminium oxide and tantalum oxide ($Al_2O_3+Ta_2O_5$) or other equivalent materials. The thin-film optical coating for red-reflecting light with the high refractive index can use, for example, tantalum oxide ($Ta_2O_5$) or other equivalent material, while the thin-film optical coating for red-reflecting light with the low refractive index can use, for example, a mixed film of aluminium oxide and tantalum oxide ($Al_2O_3+Ta_2O_5$) or other equivalent materials.

Figure 7:
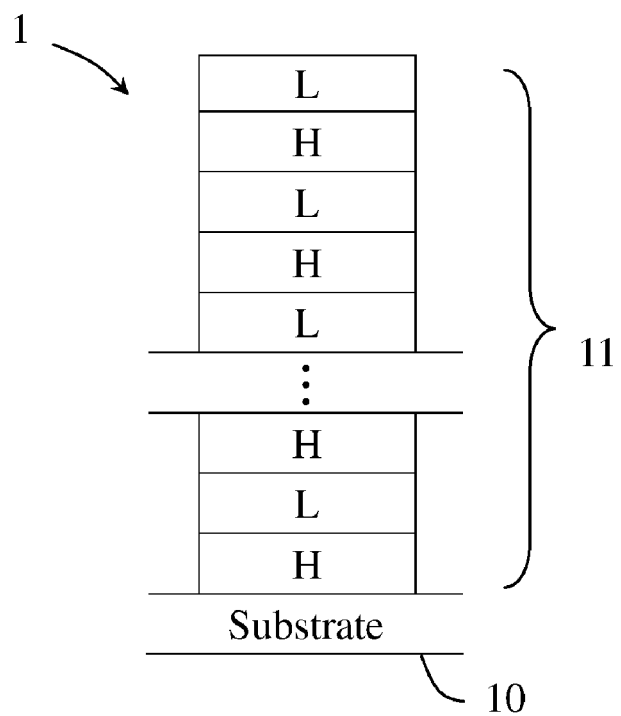
FIG. 7 shows a schematic view of the first embodiment of layers of thin-film optical coatings for blue-reflecting light according to the present invention.
Figure 8:
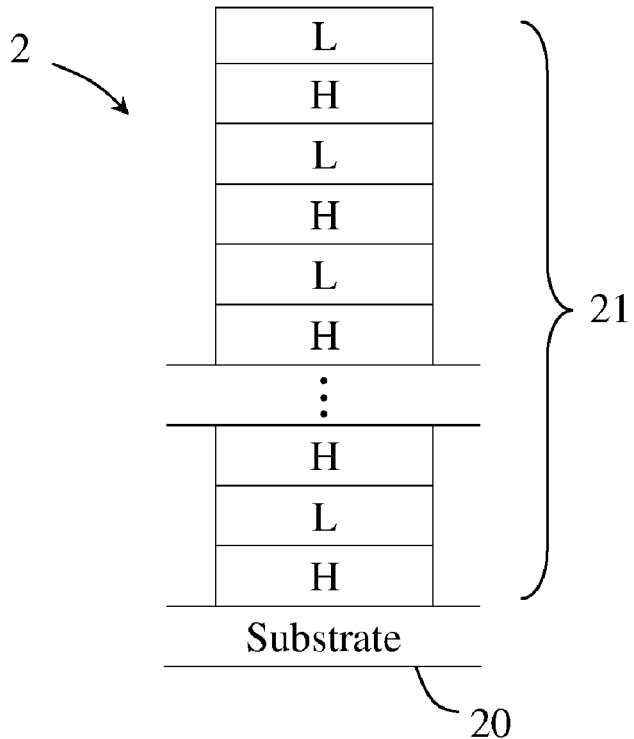
FIG. 8 shows a schematic view of the first embodiment of layers of thin-film optical coatings for red-reflecting light according to the present invention.

Referring to FIGS. 7 and 8, the multilayer design of the light combining prism uses different numbers of layers of film coatings to obtain a specific transparency ratio. According to the present invention, thin-film optical coatings 1 for blue-reflecting light are disposed over a substrate 10, which is usually a prism. The number of layers 11 for the thin-film optical coatings 1 for blue-reflecting light can be from 50 to 90. Thin-film optical coatings 2 for red-reflecting light are also disposed over a substrate 20, which is usually also a prism. The number of layers 21 for the thin-film optical coatings 2 for red-reflecting light can be from 70 to 110. For the arrangement of thickness of thin-film optical coatings, 80 layers of the thin-film optical coatings for blue-reflecting light can be about 1.0 μm, and 100 layers of the thin-film optical coatings for red-reflecting light can be about 1.2 μm.

As shown in FIGS. 7, 8 and Table 1, in the first embodiment according to the present invention, the number of layers 11 for the thin-film optical coatings 1 for blue-reflecting light is preferably 60, where the high refractive index for the thin-film optical coatings for blue-reflecting light is 2.35, and the low refractive index is 1.9. The number of layers 21 for the thin-film optical coatings 2 for red-reflecting light is preferably 80, where the high refractive index for the thin-film optical coatings for red-reflecting light is 2.2, and the low refractive index is also 1.9.

TABLE 1

| Thin-film optical coating for blue-reflecting light | | | Thin-film optical coating for red-reflecting light | | |
|---|---|---|---|---|---|
| Material | Refractive Index | No. of layers | Material | Refractive Index | No. of layers |
| High refractive index | 2.35 | 60 | High refractive index | 2.2 | 80 |
| Low refractive index | 1.9 | | Low refractive index | 1.9 | |

Figure 9:
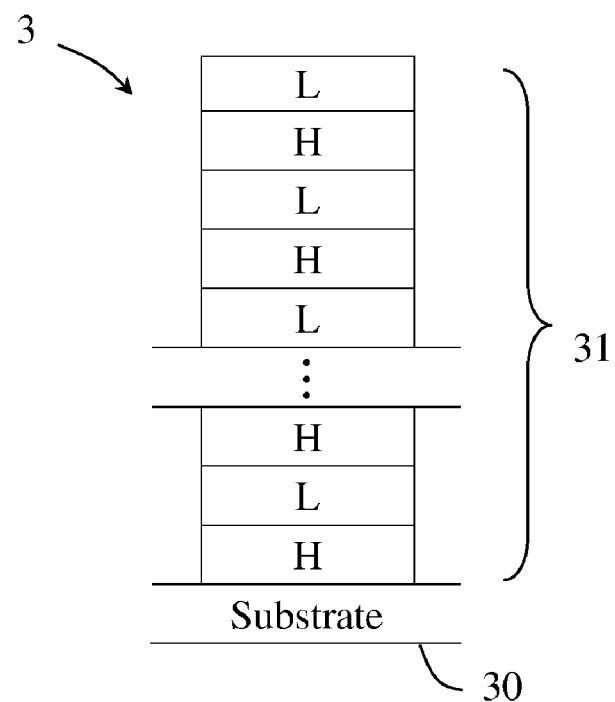
FIG. 9 shows a schematic view of the second embodiment of layers of thin-film optical coatings for blue-reflecting light according to the present invention.
Figure 10:
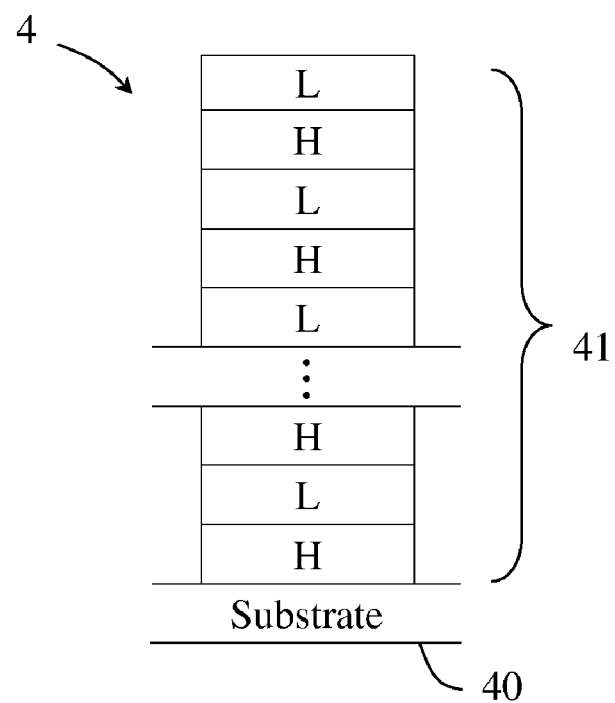
FIG. 10 shows a schematic view of the second embodiment of layers of thin-film optical coatings for red-reflecting light according to the present invention.

Referring to FIGS. 9 and 10, in the second embodiment of the present invention according to Table 2, thin-film optical coatings 3 for blue-reflecting light are disposed over a substrate 30, which is usually a prism. The number of layers 31 for the thin-film optical coatings 3 for blue-reflecting light is preferably 80, where the high refractive index for the thin-film optical coatings is 2.4, and the low refractive index is 1.87. Thin-film optical coatings 4 for red-reflecting light are also disposed over a substrate 40, which is usually also a prism. The number of layers 41 for the thin-film optical coatings 4 for red-reflecting light is preferably 100, where the high refractive index for the thin-film optical coatings for red-reflecting light is 2.2, and the low refractive index is also 1.87.

TABLE 2

| Thin-film optical coating for blue-reflecting light | | | Thin-film optical coating for red-reflecting light | | |
|---|---|---|---|---|---|
| Material | Refractive Index | No. of layers | Material | Refractive Index | No. of layers |
| High refractive index | 2.4 | 80 | High refractive index | 2.2 | 100 |
| Low refractive index | 1.87 | | Low refractive index | 1.87 | |

Figure 11:
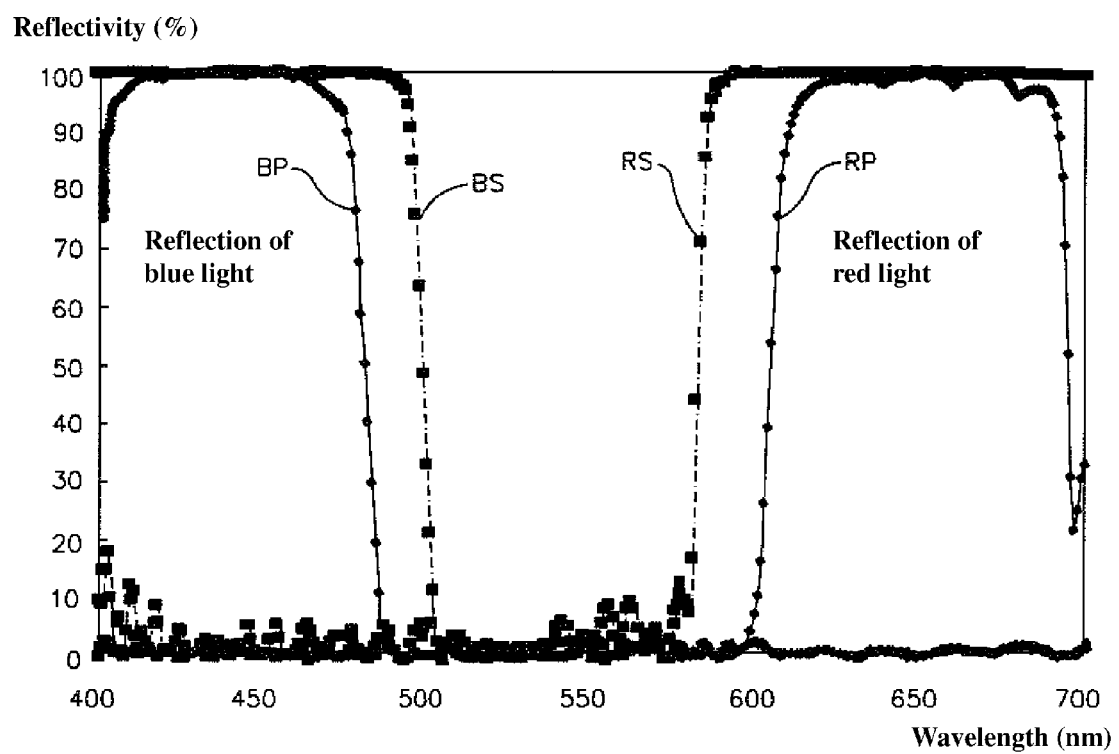
FIG. 11 shows a spectrum diagram of the thin-film optical coatings for blue-reflecting and red-reflecting lights inside the X-cube according to the present invention.

FIG. 11 shows a spectrum diagram of the thin-film optical coatings for blue-reflecting and red-reflecting lights in the X-cube according to the present invention, where BP represents the P polarised blue-reflecting light, BS represents the S polarised blue-reflecting light, RP represents the P polarised red-reflecting light, and RS represents the S polarised red-reflecting light. Since the present invention chooses materials with different refractive indexes, the ratio of high refractive index to low refractive index $$\left(\frac{n_H}{n_L}\right)$$

can be reduced from the conventional value between 1.778 and 1.533 to that between 1.296 and 1.111. Therefore, the wavelength drift of the spectrum for the P and S polarised blue-reflecting and red-reflecting lights in the X-cube is the same as that in dichroic mirrors for blue-reflecting and red-reflecting lights in the splitter system so as to improve illumination efficiency in the optical projection system.

While the invention has been described in terms of several preferred embodiments, they are not used to limit the invention. Those skilled in the art will recognise that the invention can still be practiced with modifications, within the spirit and scope of the appended claims.

What is claimed is:

1. A method for improving illumination efficiency in optical projection system, comprising the steps of:
    providing a splitter system;
    providing a light combining system using an X-cube and disposed after the splitter system; and
    choosing two materials with one refractive index close to the other to form thin-film optical coatings over dichroic mirrors for blue-reflecting and red-reflecting inside the X-cube, respectively, wherein the ratio of high refractive index to low refractive index $$\left(\frac{n_H}{n_L}\right),$$

is between 1.296 and 1.111, and the wavelength drift of the spectrum for the P and S polarizsed blue-reflecting and red-reflecting lights in the X-cube is the same as that in the splitter system; and
    increasing the number of layers of the thin-film optical coatings of the dichroic mirror for blue-reflecting to that from 50 to 90 and increasing the number of layers of the thin-film optical coatings of the dichroic mirror for red-reflecting to that from 70 to 110 such that the wavelength drift of the spectrum for the P and S polarised blue-reflecting and red-reflecting lights in the X-cube is the same as that in the splitter system;
    wherein the X-cube is squarely cut such that the plane of the thin-film optical coating of the dichroic mirror for blue-reflecting is orthogonal to that of the dichroic mirror for red- reflecting;
    wherein the incident light angle of the thin-film optical coatings of the dichroic mirrors for blue-reflecting and red-reflecting is 45°; and
    wherein the thin-film optical coating of the dichroic mirror for blue-reflecting with the high refractive index is titanium oxide ($TiO_2$), the thin-film optical coating of the dichroic mirror for blue-reflecting with the low refractive index is a mixed film of aluminium oxide and tantalum oxide ($Al_2O_3+Ta_2O_5$), the thin-film optical coating of the dichroic mirror for red-reflecting with the high refractive index is tantalum oxide ($Ta_2O_5$), and the thin-film optical coating of the dichroic mirror for red-reflecting with the low refractive index is a mixed film of aluminium oxide and tantalum oxide ($Al_2O_3+Ta_2O_5$).

2. The method for improving illumination efficiency in optical projection system according to claim 1, wherein the step of adjusting the number of layers of the thin-film optical coatings of the dichroic mirrors for blue-reflecting and red-reflecting in the X-cube comprises increasing the number of layers of the thin-film optical coatings of the dichroic mirror for blue-reflecting to 60, and that of the dichroic mirror for red-reflecting to 80.

3. The method for improving illumination efficiency in optical projection system according to claim 1, wherein the step of adjusting the number of layers of the thin-film optical coatings of the dichroic mirrors for blue-reflecting and red-reflecting in the X-cube comprises increasing the number of layers of the thin-film optical coatings of the dichroic mirror for blue-reflecting to 80, and that of the dichroic mirror for red-reflecting to 100.

4. The method for improving illumination efficiency in optical projection system according to claim 1, wherein when the way of polarisation in the splitter system is different from that in the thin-film optical coatings of the dichroic mirrors for blue-reflecting and red-reflecting in the X-cube, an optical retarder is used to correct the direction of the polarised lights such that the direction of polarisation in the splitter system is the same as that in the thin-film optical coatings of the dichroic mirrors for blue-reflecting and red-reflecting in the X-cube.

5. A light combining prism for improving illumination efficiency in an optical projection system disposed after a splitter system of the optical projection system, the prism is comprised of an X-cube by forming thin-film optical coatings over dichroic mirrors for blue-reflecting and red-reflecting thereof, respectively, characterised in that: each of the thin-film optical coatings of the dichroic mirrors for blue-reflecting and red-reflecting comprises two materials with one refractive index close to the other, wherein the ratio of high refractive index to low refractive index $$\left(\frac{n_H}{n_L}\right).$$

is between 1.296 and 1.111, and the wavelength drift of the spectrum for the P and S polarized blue-reflecting and red-reflecting lights in the X-cube is the same as that in the splitter system;
    wherein the X-cube is squarely cut such that the plane of the thin-film optical coating of the dichroic mirror for blue-reflecting is orthogonal to that of the dichroic mirror for red- reflecting;
    wherein the number of layers of the thin-film optical coatings of the dichroic mirror for blue-reflecting is from 50 to 90, and that of the dichroic mirror for red-reflecting is from 70 to 110 ;
    wherein the incident light angle of the thin-film optical coatings of the dichroic mirrors for blue-reflecting and red-reflecting is 45°; and
    wherein the thin-film optical coating of the dichroic mirror for blue-reflecting with the high refractive index is titanium oxide ($TiO_2$), the thin-film optical coating of the dichroic mirror for blue-reflecting with the low refractive index is a mixed film of aluminium oxide and tantalum oxide ($Al_2O_3+Ta_2O_5$), the thin-film optical coating of the dichroic mirror for red-reflecting with the high refractive index is tantalum oxide ($Ta_2O_5$), and the thin-film optical coating of the dichroic mirror for red-reflecting with the low refractive index is a mixed film of aluminium oxide and tantalum oxide ($Al_2O_3+Ta_2O_5$).

6. The light combining prism for improving illumination efficiency in an optical projection system according to claim 5, wherein the number of layers of the thin-film optical coatings of the dichroic mirror for blue-reflecting is 60, and that of the dichroic mirror for red-reflecting is 80.

7. The light combining prism for improving illumination efficiency in an optical projection system according to claim 5, wherein the number of layers of the thin-film optical coatings of the dichroic mirror for blue-reflecting is 80, and that of the dichroic mirror for red-reflecting is 100.

8. The light combining prism for improving illumination efficiency in an optical projection system to claim 6, wherein the high refractive index for each of the thin-film optical coatings of the dichroic mirrors for blue-reflecting and red-reflecting is 2.35 and 2.2, respectively, and the low refractive index for both of the thin-film optical coatings of the dichroic mirrors for blue-reflecting and red-reflecting is 1.9.

9. The light combining prism for improving illumination efficiency in an optical projection system to claim 7, wherein the high refractive index for each of the thin-film optical coatings of the dichroic mirrors for blue-reflecting and red-reflecting is 2.4 and 2.2, respectively, and the low refractive index for both of the thin-film optical coatings of the dichroic mirrors for blue-reflecting and red-reflecting is 1.87.

10. The light combining prism for improving illumination efficiency in an optical projection system to claim 7, wherein the thickness of 80 layers of the thin-film optical coatings of the dichroic mirrors for blue-reflecting is about 1.0 μm, and that of 100 layers of the thin-film optical coatings of the dichroic mirrors for red-reflecting is about 1.2 μm.

11. The light combining prism for improving illumination efficiency in an optical projection system to claim 5, wherein when the way of polarisation in the splitter system is different from that in the thin-film optical coatings of the dichroic mirrors for blue-reflecting and red-reflecting in the X-cube, an optical retarder is used to correct the direction of the polarised lights such that the direction of polarisation in the splitter system is the same as that in the thin-film optical coatings of the dichroic mirrors for blue-reflecting and red-reflecting in the X-cube.

* * * * *